No. 725,718. PATENTED APR. 21, 1903.
A. F. JOHNS & H. A. HILL.
JOINT FOR SHEARS, SCISSORS, OR THE LIKE.
APPLICATION FILED NOV. 3, 1902.
NO MODEL.
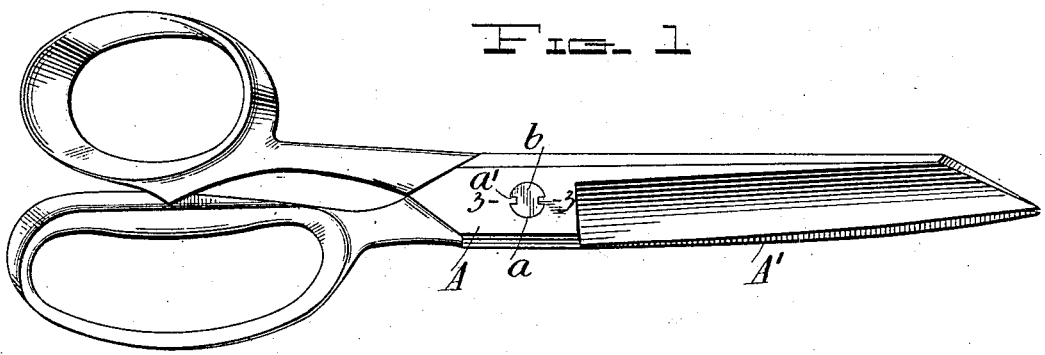
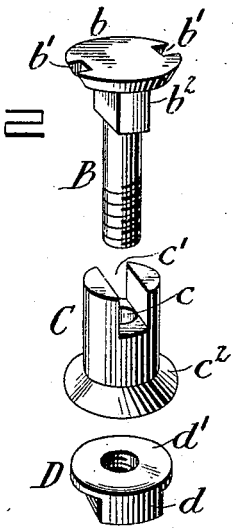
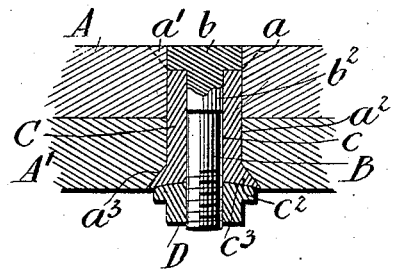
Inventors
Albert F. Johns
Herbert A. Hill
Witnesses
By
W. W. Dudley
their Attorneys

UNITED STATES PATENT OFFICE.

ALBERT F. JOHNS, OF BEAVER CITY, NEBRASKA, AND HERBERT A. HILL, OF WICHITA, KANSAS.

JOINT FOR SHEARS, SCISSORS, OR THE LIKE.

SPECIFICATION forming part of Letters Patent No. 725,718, dated April 21, 1903.

Application filed November 3, 1902. Serial No. 129,975. (No model.)

*To all whom it may concern:*

Be it known that we, ALBERT F. JOHNS, residing at Beaver City, county of Furnas, State of Nebraska, and HERBERT A. HILL, residing at Wichita, county of Sedgwick, State of Kansas, have invented certain new and useful Improvements in Joints for Shears, Scissors, or the Like; and we do hereby declare the following to be a full, clear, and exact description of the invention, such as will enable others skilled in the art to which it appertains to make and use the same.

This invention relates to joints for the members of shears, scissors, and like implements, and contemplates an improved construction of joint which in addition to capabilities in the direction of perfect adjustment of the members and of a maintenance of such adjustment possesses durability to a degree which insures to the implement a period of usefulness extending beyond that of existing implements of like character, so far as we are aware.

The nature of our invention will be readily comprehended, reference being had to the following detailed description and to the accompanying drawings, in which—

Figure 1 is a view of a shears or scissors equipped with a joint embodying our invention. Fig. 2 is an enlarged view in perspective of the parts of the joint in separated relation. Fig. 3 is an enlarged sectional view on line 3 3 of Fig. 1.

Referring to the drawings by letter, A A' denote the shears or scissors members, which may be of the usual construction.

B designates a bolt having a head $b$ of preferably tapered form and closely fitting a corresponding opening $a$ in the member A, the outer surface of the head being flush with the surface of the member, as shown in Fig. 3. The bolt is keyed or locked to the member A to turn therewith, preferably through the engagement of tongues $a'$ $a'$ on the member with recesses $b'$ $b'$, provided in opposite sides of the head $b$. The bolt is provided adjacent to the head with a squared portion $b^2$, the remainder of the bolt being of cylindrical form and screw-threaded at its opposite end.

C denotes a sleeve, through the opening $c$ of which the cylindrical portion of the bolt is passed, and $c'$ is a recess receiving the squared portion $b^2$ of the bolt, whereby the bolt and sleeve are locked together. The body of the sleeve is of cylindrical form, and the ends of the squared portion $b^2$ are curved to conform to the curvature of the sleeve, as shown in Fig. 2. The sleeve has at its outer end a tapered head $c^2$, closely fitting a tapered portion $a^3$ of the opening $a^2$ in the member A' for the sleeve, and the outer surface $c^3$ of the sleeve is of concave form, as shown in Fig. 3.

D is a nut having a threaded opening for engagement with the threaded portion of the bolt. The nut has a squared portion $d$ for the application of a wrench or the like, and the inner surface $d'$ is convex to conform to the concave surface $c^3$ of the sleeve.

It will be noted that the bolt is keyed to the member A and that the sleeve is keyed to the bolt, and as the sleeve extends inwardly beyond the member A' it receives all of the wear and relieves the bolt of friction. The employment of a cylindrical bolt of small diameter compared with the external diameter of the sleeve gives to the sleeve a considerable thickness, thus insuring durability. The sleeve conforms throughout to the openings in the members, thereby supporting the latter at all points and distributing the wear. The sleeve being fixed to the member A to turn therewith, only the member A' is loose, thereby reducing friction on the sleeve and openings in the members and minimizing wear.

It will be noted (see Fig. 3) that the head $c^2$ of the sleeve extends beyond the nut D, so that the movement of the members has no turning effect on the nut and the adjustment of the parts is constantly maintained.

We claim as our invention—

1. A joint for the members of shears, scissors and the like, consisting of a bolt locked to one member, a wear-sleeve locked to the bolt, and a nut on the bolt confining the sleeve.

2. A joint for the members of shears, scissors and the like, consisting of a bolt having a head locked to one member and a cylindrical threaded portion, a headed wear-sleeve through which the cylindrical portion of the bolt is passed, means effecting a lock between the bolt and sleeve, and a nut on the bolt confining the sleeve.

3. A joint for the members of shears, scissors and the like, consisting of a bolt having a head countersunk in and locked to an opening in one member and having a cylindrical threaded portion and a squared portion the latter extending short of the opening in the other member, a wear-sleeve having a cylindrical opening for the bolt and a recess for locking engagement with the squared portion of the bolt, a head on the sleeve countersunk in an opening in the other member, and a nut engaging the bolt and having a diameter less than that of the sleeve-head.

4. A joint for the members of shears, scissors and the like, consisting of a bolt locked to one member, a wear-sleeve locked to the bolt and having a concaved outer end, and a nut on the bolt for confining the sleeve said nut having an inner convex end.

In testimony whereof we affix our signatures in presence of witnesses.

ALBERT F. JOHNS.
HERBERT A. HILL.

Witnesses for Albert F. Johns:
R. J. HARPER,
D. J. McDERMOTT.

Witnesses for Herbert A. Hill:
W. S. HADLEY,
GEO. McCABE.